June 21, 1932.  S. CREUELS  1,864,173
DEVICE FOR CONTROLLING INTERNAL COMBUSTION ENGINES
Filed Feb. 6, 1930  2 Sheets-Sheet 2
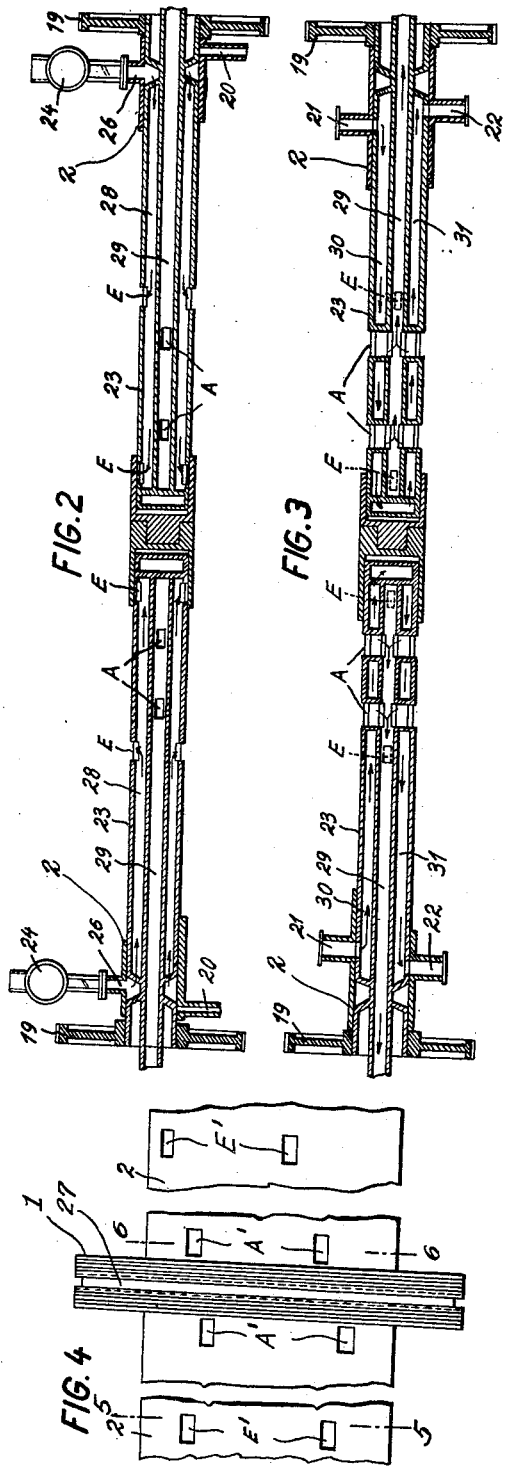
Inventor:
S. Creuels Patented June 21, 1932

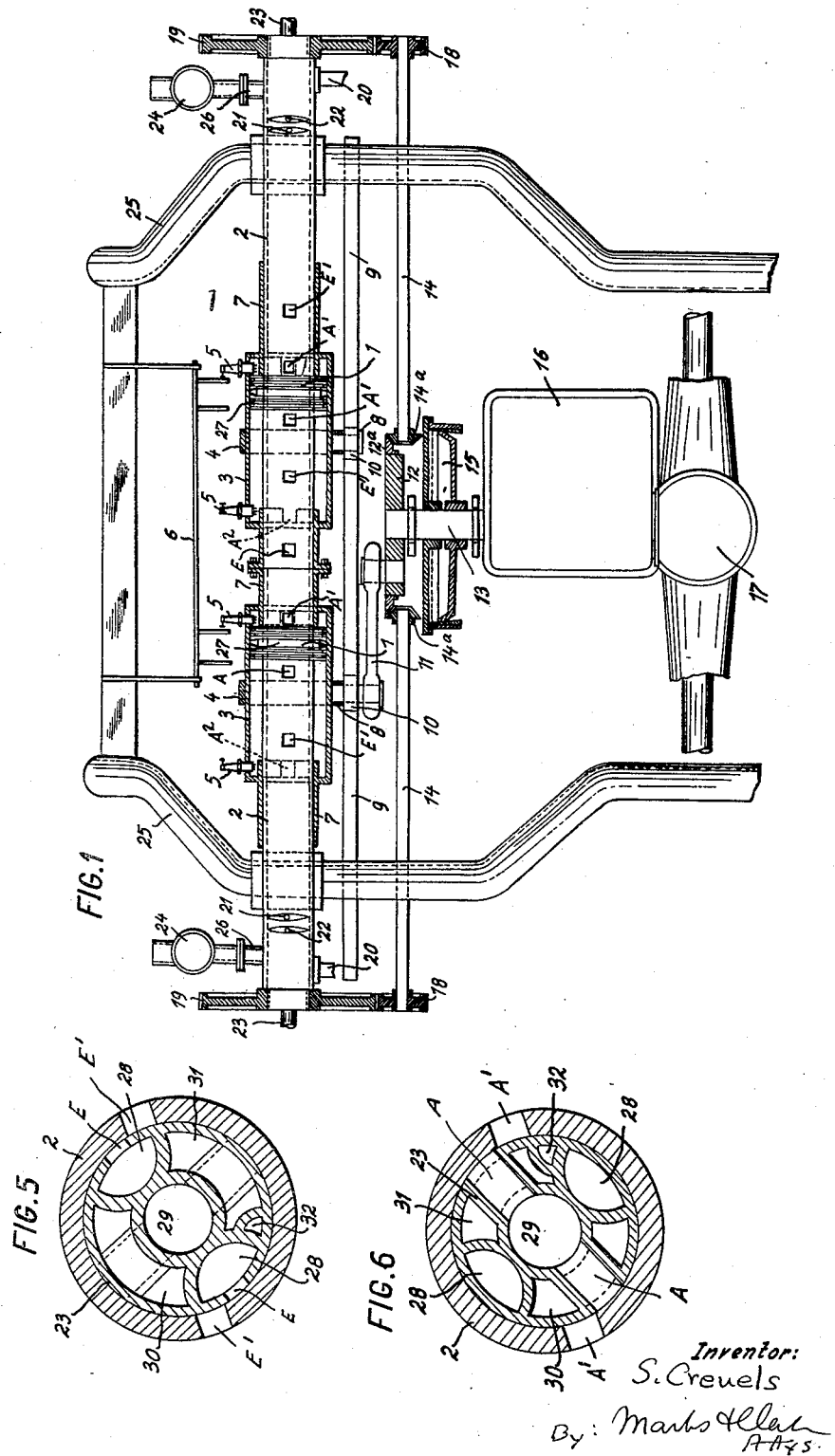

1,864,173

UNITED STATES PATENT OFFICE

STEFAN CREUELS, OF BAESWEILER-AACHEN, GERMANY

DEVICE FOR CONTROLLING INTERNAL-COMBUSTION ENGINES

Application filed February 6, 1930, Serial No. 426,415, and in Germany November 22, 1927.

The present invention relates to a device for the control of internal combustion-engines with stationary working piston and comprising a cylinder moving to and fro on the same and its piston-rod, consisting therein, that a rotary, tubular controlling element, containing supply- and exhaust-passages, revolves within the hollow piston-rod, provided with inlet and outlet-openings for the fuel and co-operating with corresponding inlet and outlet-openings of the controlling element.

This tubular controlling element is also adapted for the admission and discharge of the cooling-water and lubricating-material and for this purpose is provided with passages. The oil-passage, connected with the oil-supply, is, during rotation of the tube connected with an all-around running lubricating-groove of the piston, by means of a pipe-connection.

In tandem-arrangement of the cylinders, or arrangement of the same side by side, the hollow piston-rod for the controlling-tube is passed through the two cylinders and the same are, in this case, connected by a common, preferably divided guide-tube, or a plurality of controlling-tubes is arranged parallel with hollow piston-rods carrying one or several pistons each.

One construction, embodying the present invention, is illustrated by the accompanying drawings by way of example, in which Figure 1 shows the general arrangement by a horizontal section through an automobile motor, Figure 2 is a longitudinal section through the controlling-tube also showing the end portions of the piston rod broken away, Figure 3 a longitudinal section similar to Fig. 2 but taken at right angles thereto, Figure 4 shows the piston with a portion of its hollow piston-rod in elevation, Figure 5 is a section on the line 5—5 and Figure 6 is a section on the line 6—6 of Fig. 4.

An automobile-motor has been selected as example for the illustration of the invention, though the invention may be applied to other power-engines, as mentioned above. The motor comprises two cylinders arranged tandem.

The pistons 1 are arranged stationary, and packed relative to the cylinders 3, moving to and fro on the pistons, by means of piston-rings.

In the middle of the piston 1 is provided a circumferential oil-grove 27, whereby the working surface of the cylinder is provided with oil. The groove 27 is supplied with oil by a passage 32 of the controlling-tube 23. The piston is hollow and connected with the cooling-water pipe-line 21, 22. The pistons 1 are mounted upon a hollow piston-rod 2, firmly supported by the carriage-frame 25. The connections 21 for cold water, 22 for hot water, 20 for oil and 26 for the supply of gas from the carburettor 24, are located outside of the said support. E′ and A′ indicate inlet and outlet-openings in the hollow piston, being, in Fig. 1, for the sake of simplicity, drawn in one line, while they are, in reality, as shown in Fig. 4 staggered as shown. The rotary controlling-tube 23 is provided with corresponding openings. The cylinders 3 contain a cylindrical mantle sliding on the piston 1 and provided with covers at the ends, comprising two outside disposed guide-tubes 7, and one common guide-tube 7 located between the same, wherewith the cylinders, slide upon the firmly supported hollow piston-rod 2, of the pistons 1.

The guide-tubes 7 extend into the cylinder for a distance corresponding to the length of the compression-space, but present a recess $A^2$ free for the purpose of permitting the exhaust, said recess being somewhat larger than an outlet-opening A. By this projection of the guide-tubes 7 into the cylinder-space, a saving in width of the motor and the carriage-frame is gained. Packing between the guide-tube 7 and the hollow piston-rod 2 is effected by piston-rings, the grooves for which are provided in the hollow piston-rod. The guide-tube is preferably made in one piece with the cylinder-cover. The central, common guide-tube is, for the purpose of facilitating assembling, preferably divided in the middle and the two parts are connected by means of flanges, bolts and nuts as shown in Fig. 1. The cylinder may be provided outside with cooling-ribs and is furthermore provided with the usual threaded openings for receiving the sparking plugs 5, supplied with current from a cable-tube 6 by contact-springs against which the contact-buttons of the plugs strike during the movement of the cylinders in one direction so, that upon breaking contact during reversal of the moving-direction, the igniting spark is produced at the poles of the sparking-plug inside the cylinder-chamber.

The transmission of the energy from the moving cylinders 3, to the power-shaft 13 is effected by pivots 8, fastened by clips 4 fitted around the cylinders 3 and connected by a slide bar 9 guided on the carriage-frame at the point 10, one pivot 8 is connected with the one end of the connecting-rod 11, the other end of which is connected with the crank-pin of the flywheel 12, mounted upon the shaft 13. The shaft 13 also carries the coupling 15, the speed-change- and reversing-gear in box 16 and the differential gear in the casing 17. These parts are mounted close together in order to enable the front-wheel drive of the vehicle. The drive for the control tube 23 is derived from the crank-shaft 13 by means of a bevel-gear 12a on the flywheel 12, engaging one bevel-gear 14a each at the end of the shafts 14, at the other end of which one spur-gear 18 each is mounted, each latter spur gear engaging a spur-gear 19 on the controlling-tube 23.

The controlling-tube 23 is provided with a passage 32 connected with the oil supply-pipe 20 of the hollow piston-rod, whereby the oil is supplied to the different points to be lubricated.

The tube 23 is furthermore provided with passages 30 and 31 connected with the sockets 21, 22 of the hollow piston-rod 2 for the purpose of supplying and discharging the cooling-water, circulated by a pump or the like through the radiator and the pipe-system. The tube 23 is further provided with a passage 28 connected with the socket 26 of the carburettor 24 for supplying fuel to the cylinders 3 and a passage 29 for discharging the combustion-gases. The passages 28 and 29 are, by means of inlet and outlet-openings E and A connected or disconnected during rotation of the controlling-tube 23 with corresponding inlet and outlet-openings E' and A' of the rigid, hollow piston-rod 2 and thereby with the interior of the cylinders, whereby admission of the fuel to the cylinders and discharge of the combustion-gases are regulated.

I claim:

1. In an internal combustion engine, a stationary piston, a hollow piston rod supporting the piston and having ports therein for the inlet of fuel and the outlet of combustion products, a movable cylinder receiving the pistons, and a tubular controlling element movable in the piston rod and having ports movable into registration in the ports in the piston rod.

2. In an internal combustion engine, a stationary piston, a hollow piston rod supporting the piston and having ports therein for the inlet of fuel and the outlet of combustion products, a movable cylinder receiving the pistons, and a tubular controlling element movable in the piston rod and having ports movable into registration in the ports in the piston rod, and means for transmitting movement from the cylinders to the controlling element to effect actuation of the latter.

3. In an internal combustion engine, a stationary piston, a hollow piston rod supporting the piston and having ports therein for the inlet of fuel and the outlet of combustion products, a movable cylinder receiving the pistons, and a tubular controlling element movable in the piston rod and having ports movable into registration in the ports in the piston rod, and means transmitting movement from the cylinder to the controlling element to effect actuation of the latter, said movement transmitting means including a flywheel located intermediate the cylinders and controlling element.

4. An engine as claimed in claim 1, characterized by the provision of passages in the controlling element for supplying cooling medium to the piston.

5. An engine as claimed in claim 1, characterized by the provision of separate passages in the controlling element for conducting cooling medium and lubricant to the piston.

6. An engine as claimed in claim 1, characterized by the provision of a plurality of said pistons and said cylinders, the cylinders being arranged in tandem, and a divided guide sleeve for the piston rod connecting the cylinders.

7. In an internal combustion engine, a stationary piston, a movable cylinder receiving the piston, a rod forming a support for the piston and a guide for the cylinder and having ports therein, and valve means movable in the rod to control said ports.

STEFAN CREUELS.